W. A. HENDRICKSON.
POTATO PICKER MECHANISM FOR POTATO PLANTERS.
APPLICATION FILED JULY 2, 1919.
1,314,398.   Patented Aug. 26, 1919.
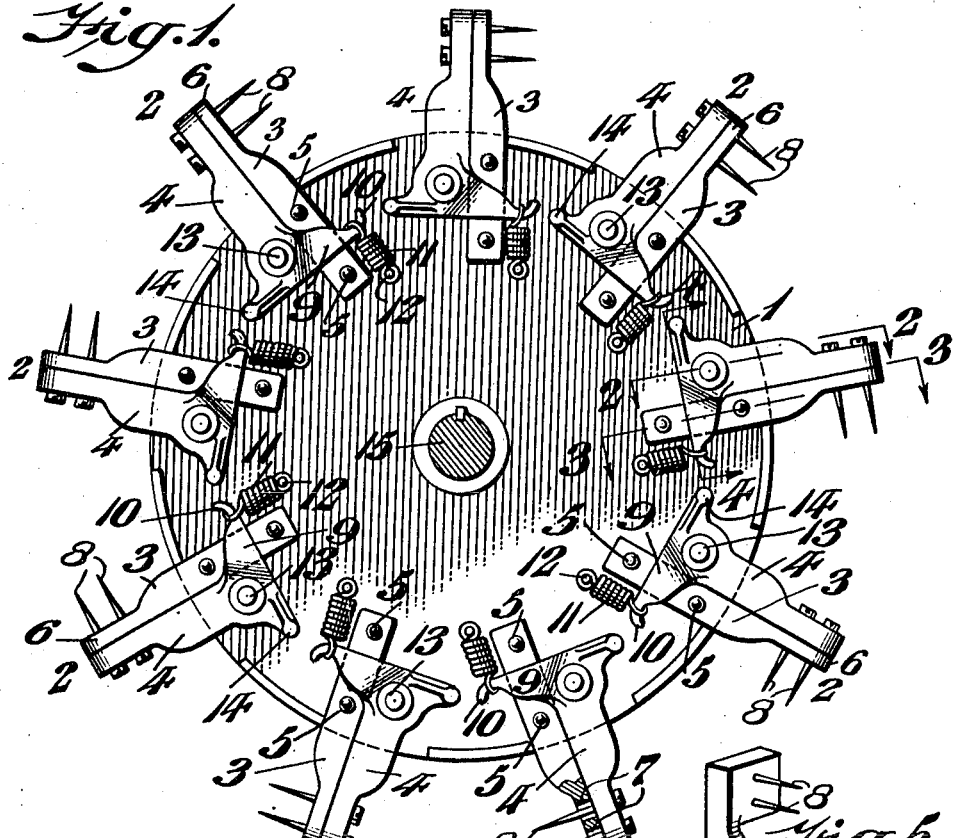
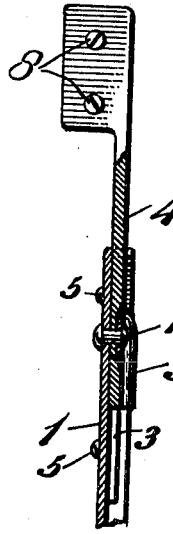
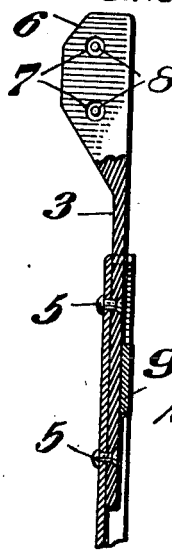
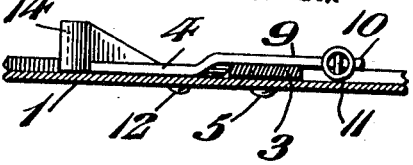
INVENTOR
William A. Hendrickson.
BY
ATTORNEYS.

UNITED STATES PATENT OFFICE.

WILLIAM A. HENDRICKSON, OF RIVERTON, NEW JERSEY, ASSIGNOR TO McWHORTER MANUFACTURING COMPANY, OF RIVERTON, NEW JERSEY, A CORPORATION OF NEW JERSEY.

POTATO-PICKER MECHANISM FOR POTATO-PLANTERS.

1,314,398.  Specification of Letters Patent.  Patented Aug. 26, 1919.

Application filed July 2, 1919. Serial No. 308,303.

*To all whom it may concern:*

Be it known that I, WILLIAM A. HENDRICKSON, a citizen of the United States, residing at Riverton, county of Burlington, State of New Jersey, have invented a new and useful Potato-Picker Mechanism for Potato-Planters, of which the following is a specification.

In a prior patent granted to Allen McWhorter, No. 1,287,601, December 10th, 1918, there is shown, described and broadly claimed, a novel construction of a potato planter, which is provided with a rotatable device carrying impaling mechanism which is adapted to be operated at intervals to impale potatoes and release the same so that they are dropped uniformly and regularly to the ground in the operation of planting, provision being made for rendering said impaling mechanism temporarily inoperative, so as to stop the planting when desired.

My present invention resides particularly in improvements in the picker operating mechanism, shown particularly in Figures 6 to 9, of the patent aforesaid, wherein it will be seen that the pivotal members of the impaling mechanism are mounted pivotally one directly upon the other.

In my present invention, I have shown a rotary head or member supporting the potato picking devices 2, which head is provided with a stationary arm or member, bolted or otherwise secured to said head, and a pivotal arm or member pivoted directly upon said head in proximity to said stationary member, said pivotal member being provided with an offset guiding arm which rides upon the shank of said stationary member, so that the impaling pins of the pivotal arm will always properly aline with the holes in the stationary arm.

As in the patent aforesaid, I actuate the pivotal members by a suitable cam or tripping mechanism but I collocate the springs or tension devices differently from the construction shown in the aforesaid patent, since I attach one end of each spring to said rotary member, which carries the picker mechanism, the other end of said spring being attached to a hook on the offset arm of said pivotal member.

To the above ends my invention consists of a novel construction of picker mechanism, comprising a stationary member bolted to a rotatable head, a pivotal member pivotally mounted directly upon said rotatable head and having an offset arm, which is guided upon the shank of said stationary member, said arm being provided with a hook, which is engaged by one end of a tension device whose other end is secured to said rotary member, while the end of said pivotal member opposite to said arm is provided with a lug or projection adapted to be intermittently tripped or actuated by a suitable cam member.

For the purpose of illustrating my invention, I have shown in the accompanying drawing one form thereof which is at present preferred by me, since the same will be found in practice to give satisfactory and reliable results, although it is to be understood that the various instrumentalities of which my invention consists can be variously arranged and organized and that the invention is not limited to the precise arrangement and organization of these instrumentalities as herein shown and described.

Fig. 1 represents a side elevation of a potato picker mechanism, embodying my invention, showing the elements thereof constituting my invention in assembled position.

Fig. 2 represents a section on line 2—2 Fig. 1.

Fig. 3 represents a section on line 3—3 Fig. 1.

Fig. 4 represents a section on line 4—4 Fig. 1.

Fig. 5 represents a perspective view of the pivotal picker member, in detached position.

Similar numerals of reference indicate corresponding parts.

Referring to the drawings.

1 designates the rotary head or rotatable member which supports or carries the picking mechanisms 2 of the potato planter, which are in practice eight in number and are properly spaced apart as indicated in Fig. 1, said devices comprising a relatively stationary member 3 and a pivotal member 4. The stationary member 3 is provided with an inner shank which is bolted or otherwise secured, preferably at two points as indicated at 5, to said rotary member 1, the outer or opposite ends 6 of said stationary member being provided with holes 7, through which the impaling pins 8 pass, which are preferably two in number, and are secured to the outer end of the pivotal member 4 in any suitable manner.

The pivotal member 4 is preferably constructed as will be best understood from Fig. 5 and comprises a body portion having an outer terminal member in which the pins 8 are mounted and an inner offset arm 9, which terminates in a hook 10, which is attached to one end of the spring or tension device 11, the opposite end of said spring being secured to the pin or other fixed member 12 carried by the rotary member or disk 1, it being observed that the pivotal arm or member 4 is pivoted at the point 13 directly to the rotary disk 1 and is provided with a projection or lug 14, which is adapted to be engaged at the proper intervals by any suitable tripping means or cam mechanism, such as is seen in the patent to Allen McWhorter No. 1,287,601, of December 10th, 1918, aforesaid.

I preferably locate the lug member 14 which is operated by a cam at proper intervals substantially as seen in Fig 3, opposite to the hook 10, so that the action of the spring 11 will be quick and instantaneous, thereby restoring the various parts to the normal position, seen in Fig. 1.

The rotary head 1 is preferably mounted upon the shaft 15, it being understood that said shaft and head rotate in unison and in coöperation with a suitable hopper and its adjuncts, as seen in Fig. 3 of the McWhorter patent aforesaid.

The operation is as follows:

It will be understood from reference to the prior McWhorter patent aforesaid that the general arrangement and collocation of the rotary head carrying the picker mechanism herein disclosed and their general mode of operation with respect to the hopper and the selecting and impaling of the potatoes to be planted is substantially the same as disclosed in said patent as far as the location of the rotary head 1 in the hopper and the actuation of the pivotal arms 4 are concerned, and I therefore deem it unnecessary to describe in detail the entire cycle of operation shown in the patent aforesaid, except to say that the manner of tripping or intermittently actuating the pivotal members 4 is substantially the same as in the patent aforesaid.

The advantages of my present invention will be readily apparent to those skilled in the art, since the pivotal members 4 can be readily removed from the rotatable head by simply removing the pivot 13, and in case of accident or damage to either of the members 3 or 4, either one or the other can readily be removed or replaced without disturbing the other, as is evident.

Furthermore, it is important in this class of devices that the impaling pins 8 properly aline at all times with the holes 7, which act as a wiper to remove the impaled potato at the proper periods, as in the patent aforesaid, which I effect by causing the offset inner surface of the arm 9 to ride upon the contiguous surface of the stationary arm 3, as will be best understood from Fig. 4, wherein it will be seen that elongated contiguous bearing surfaces are provided for the stationary and pivotal members so as to cause the impaling pins 8 to properly aline at all times with the holes 7.

It will now be apparent that I have devised a novel and useful construction of a potato picker mechanism for potato planters which embodies the features of advantage enumerated as desirable in the statement of the invention and the above description, and while I have, in the present instance, shown and described a preferred embodiment thereof which will be found in practice to give satisfactory and reliable results, it is to be understood that the same is susceptible of modification in various particulars without departing from the spirit or scope of the invention or sacrificing any of its advantages.

Having thus described my invention, what I claim as new and desire to secure by Letters Patent, is:

1. In a potato planter, a rotary head, a stationary arm having a shank secured fast to said head and having a hole in the outer end thereof, a movable arm pivoted directly to said head and carrying an impaling pin on its outer extremity, said pivoted arm having at its inner end an offset arm having a portion extending transversely across said shank, the latter serving as a guide for said pivotal arm, a hook located on said offset portion, a lug on said pivoted arm located oppositely to said hook, and a spring having one end attached to said hook and its other end attached to said head.

2. In a potato planter, a rotary head, a plurality of potato picking mechanisms mounted on said head in radial lines, each of said mechanisms comprising a stationary arm having its shank secured directly to said head, a movable arm pivoted directly to said rotary head and having impaling pins in its outer end coöperating with holes in the outer end of said stationary arm, an offset portion on the inner end of said pivotal arm extending across said shank and adapted to ride and be guided upon said shank, a hook in said offset arm, a lug on said arm opposite said hook and adapted to be engaged by a tripping mechanism, and tension devices common to said hook and said rotary head for causing the outer ends of said arms to normally be in contact and said pins to project through said holes.

WILLIAM A. HENDRICKSON.

Witnesses:
C. D. McVay.
F. A. Newton.

Copies of this patent may be obtained for five cents each, by addressing the "Commissioner of Patents, Washington, D. C."